(12) United States Patent  (10) Patent No.: US 6,709,210 B2
Lowry et al.  (45) Date of Patent: *Mar. 23, 2004

(54) SPRING FASTENER OF HIGHLY IMPROVED PULLING FORCE

(75) Inventors: Joseph William Lowry, Liberty, IL (US); Eustathios Vassiliou, Newark, DE (US)

(73) Assignee: Eustathios Vassiliou Revocable, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/210,246

(22) Filed: Aug. 1, 2002

(65) Prior Publication Data

US 2003/0202858 A1 Oct. 30, 2003

Related U.S. Application Data

(60) Provisional application No. 60/376,828, filed on Apr. 29, 2002, now Pat. No. 6,409,443.

(51) Int. Cl.⁷ .............................. F16B 13/06; F16B 37/04
(52) U.S. Cl. .......................... 411/55; 411/60.2; 411/61; 411/183; 411/913
(58) Field of Search ........................... 411/55, 60.2, 61, 411/182, 508, 913, 183, 258

(56) References Cited

U.S. PATENT DOCUMENTS

| 4,500,238 | A | | 2/1985 | Vassiliou | 411/30 |
|---|---|---|---|---|---|
| 4,765,788 | A | | 8/1988 | Nowak et al. | 411/61 |
| 4,874,277 | A | | 10/1989 | Nowak et al. | 411/61 |
| 4,925,351 | A | * | 5/1990 | Fisher | 411/182 |
| 4,941,340 | A | | 7/1990 | Nowak et al. | 72/379.2 |
| 5,100,273 | A | | 3/1992 | Vassiliou | 411/60 |
| 5,429,467 | A | | 7/1995 | Gugle et al. | 411/182 |
| 5,725,343 | A | | 3/1998 | Smith | 411/55 |
| 5,873,690 | A | * | 2/1999 | Danby et al. | 411/182 X |
| 6,095,735 | A | | 8/2000 | Weinstein et al. | 411/182 |
| 6,280,129 | B1 | | 8/2001 | Lowry et al. | 411/55 |
| 6,409,443 | B1 | | 6/2002 | Lowry et al. | 411/55 |

* cited by examiner

Primary Examiner—Neill Wilson
(74) Attorney, Agent, or Firm—E. Vassiliou

(57) ABSTRACT

A fastener having a head and two expandable legs. The fastener further has a Y-shaped funnel configuration, which has been formed by a partial cut of the legs. The sides of the Y-shaped funnel comprise inwardly bent portions which are designed to extend into the slot of an object. The bent portions produce jamming and clamping when an expanding member is inserted through a hole on the head, resulting to highly improved pulling force. The fastener may be used in slots of different widths and may be pulled easily out of the slots, if so desired, in contrast with the fasteners of the present state in the art. Further, the fastener may be used in vehicles to connect one or more parts together.

43 Claims, 3 Drawing Sheets

SPRING FASTENER OF HIGHLY IMPROVED PULLING FORCE

RELATED APPLICATIONS

This application claims priority of provisional patent application 60/376,828, filed on Apr. 29, 2002, which is incorporated herein by reference in its entirety.

FIELD OF THE INVENTION

This invention pertains fasteners, and more particularly fasteners which have expandable legs and which attach one object to another object. It also pertains combinations of one or more objects with said fastener(s), parts or objects connected with the fastener(s), as well as vehicles comprising parts connected with said fastener(s).

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult, if not impossible, for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels. Further, such connections are not water-resistant and water may be easily penetrate the connection point and be transferred from one side of one or both objects to the other side.

Fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. The second part of the fastener, being usually a bolt or a screw, supports the second object by forcing the legs of the fastener (as described for example in U.S. Pat. No. 4,500,238) to open or expand, thereby securing the two objects together. The fasteners of this type have greatly improved the prevailing torque (torque required to render a screw loose), as well as the pulling force (pulling force applied on a screw to the point of failure) of the system.

The fasteners of the type described in U.S. Pat. No. 4,500,238 have a funnel portion into which an expanding is driven for expanding the legs of the fastener. This funnel has a bucket-like shape which has been impressed on the legs during the manufacture of the fastener. This impression derived funnel is rather inflexible and in some occasions has a tendency to drive the expanding member in undesired direction.

An example of fasteners having oblong funnels is described in U.S. Pat. No. 6,280,129 B1 (Lowry et al.), which is incorporated herein by reference. U.S. Pat. No. 6,409,443 (Lowry et al.), which is also incorporated herein by reference, discloses a spring fastener having a Y-shaped cut funnel, and which may eliminate, if so desired, barbs which are used to support the fastener in one of the parts to be connected together by said fastener. In addition, the funnel configuration may be used to provide additional engagement, a very desirable attribute in a plurality of occasions. However, the mechanism of the additional engagements is shown to be under the panel or object to which the fastener is secured, and the counter force developed, when pulling of the expanding member occurs, is considerably weaker than that of the present invention.

A large number of advantages are derived from the critical configuration of the funnel of the present invention, which produces jamming and clamping of the expanding member within the slot into which the fastener is inserted, resulting to highly improved pulling force, as described in detail hereinbelow. In addition, the fastener of the present invention may be used in slots of different widths without any problems of rattling noises. Further, the fastener of this invention may be pulled easily out of the slot, if so desired, in contrast with the fasteners of the present state in the art, which are destroyed when pulled, due to the barbs been presently utilized.

SUMMARY OF THE INVENTION

In the text presented below, the following comments and definitions are appropriate:

The expanding member is preferably a screw having threads and a root on which the threads are supported.

Pitch of a screw is defined as the distance between two consecutive threads of the screw.

Engageable hole or region is an at least partial hole or region which can be engaged with a screw, or similar element.

At least partial hole may be a part of a hole, such as an arc for example. However, the hole does not have to be round.

Curved portion is defined as a portion having a non-linear configuration, even if it comprises smaller non-aligned linear sections, such as saw tooth for example.

This invention is related to a combination of a first object, such as a panel for example, having a slot and a fastener comprising:

(a) a substantially flat head portion having an engageable hole through which an expanding member can pass through and engage;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface and a contact region, the two inner surfaces of the two legs being at an initial proximity with each other, the legs being expandable in opposite directions upon inserting the expanding member; and (d) a Y-shaped funnel in the vicinity of the contact region, the Y-shaped funnel having a first width, and funnel sides having been formed by partially cut leg portions extending outwardly from the legs, funnel bents, and inwardly bent portions with edges, the inwardly bent portions being of adequate size so as to partially extend into the slot of the first object, when the fastener is positioned in the slot.

This invention also pertains a fastener comprising:
(a) a substantially flat head portion having an engageable hole through which an expanding member can pass through and engage;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface and a contact region, the two inner surfaces of the two legs being at an initial proximity with each other, the legs being expandable in opposite directions upon inserting the expanding member; and
(d) a Y-shaped funnel in the vicinity of the contact region, the Y-shaped funnel having a first width, and funnel sides having been formed by partially cut leg portions extending outwardly from the legs, funnel bents, and inwardly bent portions with edges, the inwardly bent portions being of adequate size so as to partially extend into a slot of a first object, when the fastener is positioned in the slot.

The head of the fastener may have an upper side and a lower side or it may have a single side corresponding to the lower side. Fasteners having single sided heads are described in U.S. Pat. No. 6,250,864 B1, which is incorporated herein by reference.

The hole may be substantially round having a diameter, and the funnel may preferably have a first width longer than the diameter of the hole. The hole may also comprise an oblong opening having a second width, the second width being preferably at least as long as the first width.

Preferably, the expanding member has threads, a root, and a pitch.

The inwardly bent upper portions may have curved portions or partial holes. The funnel bents may comprise ribs for increasing structural integrity.

As also aforementioned, when water-proofing, and/or gas-proofing are desired for a particular application, and/or vibration noises are to be prevented, an elastic body is preferably integrally molded at least at the lower side of the substantially flat head portion. Such elastic bodies are for example disclosed in U.S. Pat. Nos. 5,725,343 (Smith), and 6,379,092 (Patel et al.) both of which are incorporated herein by reference.

An elastic body 7, as aforementioned, is exemplified in FIG. 8.

The funnel bents are preferably separated by a distance larger than the width of said slot.

Also, preferably, each of the funnel bents is separated from the lower side of the head by a distance smaller than the thickness of the first object.

The bents have preferably an angle which is adequately large to allow the fastener to be removed from the first object without destruction of said fastener, when the removal takes place solely from the side of the first object, wherein the head of the fastener is positioned.

The fasteners of this invention may comprise more than one engagement regions, as disclosed for example, in non-provisional application 09/699,760 (Vassiliou), filed Oct. 30, 2000, which is incorporated herein by reference.

The present invention further pertains parts connected with the above described spring fasteners and/or combinations, as well as vehicles comprising parts connected with the above described spring fasteners.

BRIEF DESCRIPTION OF THE DRAWING

The reader's understanding of this invention will be enhanced by reference to the following detailed description taken in combination with the drawing figures, wherein.

DETAILED DESCRIPTION OF THE INVENTION

As already mentioned, the fasteners of the type described in U.S. Pat. No. 4,500,238 have a funnel portion into which an expansion member is driven for expanding the legs of the fastener. This funnel has a bucket-like shape which has been impressed on the legs during the manufacture of the fastener. This impression derived funnel is rather inflexible and in some occasions has a tendency to drive the expanding member in undesired direction.

An example of fasteners having oblong funnels is described in U.S. Pat. No. 6,280,129 B1 (Lowry et al.), which is incorporated herein by reference. U.S. Pat. No. 6,409,443 B1 (Lowry et al.), which is also incorporated herein by reference, discloses a spring fastener having a Y-shaped cut funnel, and which may eliminate, if so desired, barbs which are used to support the fastener in one of the parts to be connected together by said fastener. In addition, the funnel configuration may be used to provide additional engagement, a very desirable attribute in a plurality of occasions. However, the mechanism of the additional engagements is shown to be under the panel or object to which the fastener is secured.

The present invention pertains a combination of a panel having a slot and a fastener of critical configuration, as well as the fastener by itself, which fastener comprises a funnel providing a large number of advantages to the combination and to the fastener. The invention also pertains parts connected with the fastener, as well as vehicles comprising the combination or part connected with the fastener.

Figure 1:
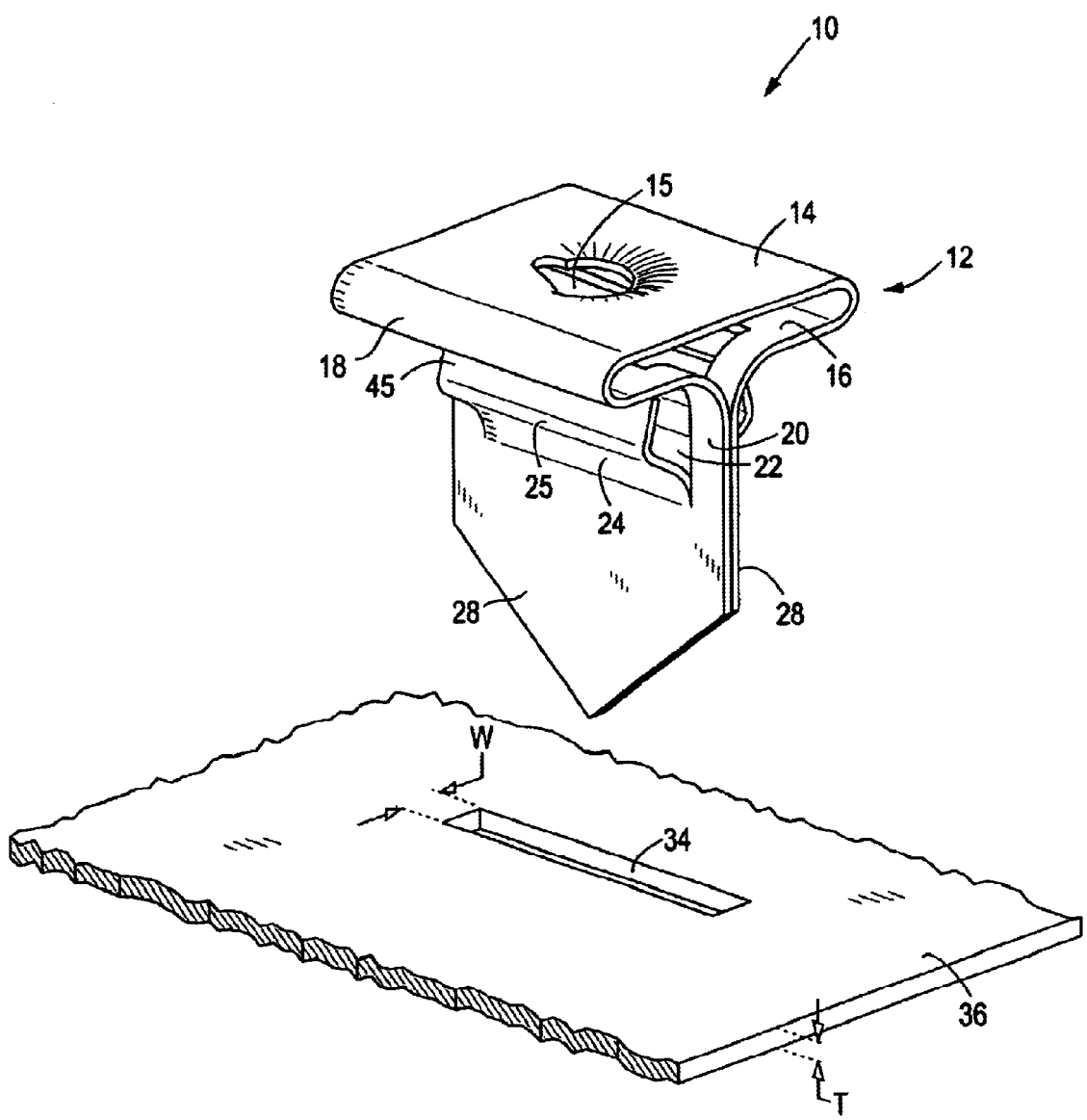
FIG. 1 is a perspective view of a combination of a fastener, according to a preferred embodiment of this invention, and a panel with a slot, on which panel the fastener is intended to fasten another object.
Figure 2:
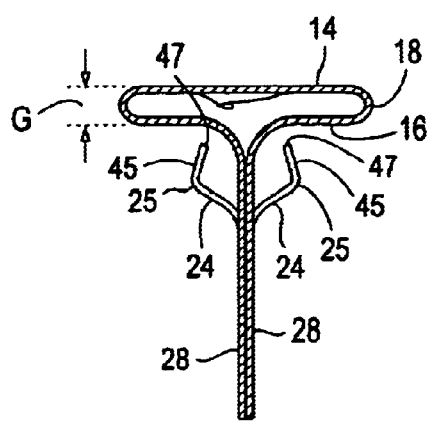
FIG. 2 is a cross-sectional view of the fastener of FIG. 1.
Figure 3:
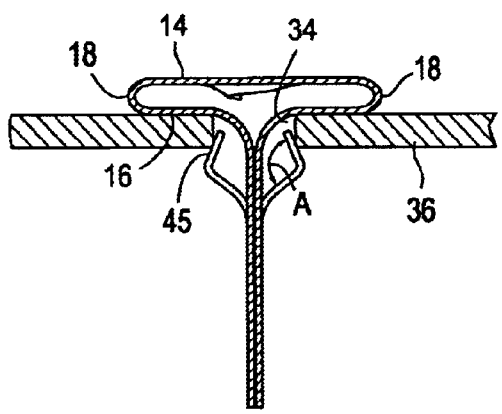
FIG. 3 is a cross-sectional view of the fastener of FIG. 1 and a first object, after the fastener has been inserted into the slot of the first object.

Referring now to FIGS. 1 and 2, there is depicted a spring fastener 10 according to a preferred embodiment of this invention. There is also depicted in FIGS. 1 and 3 a combination of a spring fastener 10 and a first object, such as the panel 36, having a slot 34. The panel 36 has a thickness T, while the slot 34 has a width W.

As shown in FIG. 1, the combination may be unassembled, or it may be in an assembled form, as shown in FIG. 3.

The fastener 10, comprises a substantially flat head portion 12. The substantially flat head portion 12 has an upper side 14, and a lower side 16.

Figure 4:
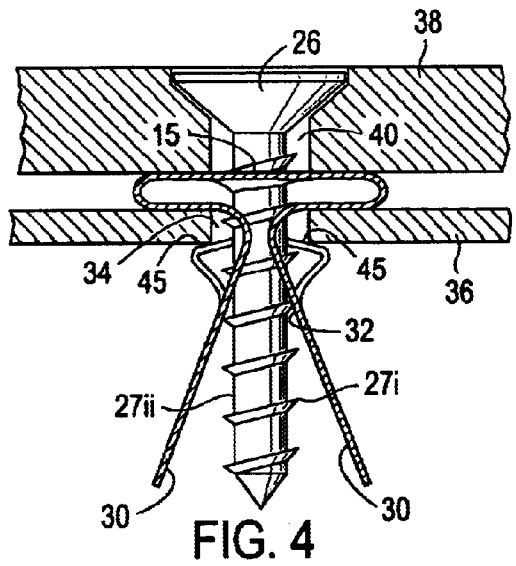
FIG. 4 is a cross-sectional view of the combination of the fastener of FIG. 1 and a first object, after a second object has been secured on said combination by a screw which has also expanded the legs of the fastener and jammed or clamped by the edges of the inwardly bent portions within the slot.

The upper side 14 has a hole 15, which is engageable to an expanding member 26 (better shown in FIG. 4). The upper side 14 and the lower side 16 may be separated by a gap G as better shown in FIG. 2, or they may be substantially in contact (not shown for purposes of clarity) with each other, depending on the application. The upper side 14 is connected to the lower side 16 through head bents 18.

The larger the gap G the larger the radius of the head bents 18, and therefore, the higher the pulling force which is needed to break the hardened fastener at the head bent regions. However, there are occasions when a small gap or absence of a gap is necessary usually due to space requirements. In such occasions, a single-sided head may also be utilized, as disclosed in U.S. Pat. No. 6,250,864 B1, which is incorporated herein by reference.

One of the major objectives of the instant invention is to relieve the pulling force applied at the bents 18 when items connected with the fastener tend to separate.

The fastener 10 further comprises a neck 20 having a cutting or opening 22. The neck 20 extends from the lower side 16 of the substantially flat head portion 12 at a substantially right angle in its length with respect to the substantially flat head portion 12 of the fastener 10. The opening 22 may have any appropriate dimensions.

The fastener 10 also comprises two substantially flat legs 28, extending from the neck 20, and having inner surfaces 30 (see FIG. 4), the two inner surfaces 30 of the two legs 28 being at an initial proximity with each other, the legs being expandable in opposite directions upon inserting through and engaging to the engageable hole 15 the expanding member, such as screw 26 having threads 27i and a root 27ii (see FIG. 4), and a pitch, thus bringing the expanding member 26 to contact regions 32 of the inner surfaces 30 of the legs 28.

At the bottom of the opening 22 there is disposed a Y-shaped, preferably oblong, funnel 24 for guiding and providing additional engagement to the expanding member 26, such as a screw 26 (see FIG. 4), for example.

The Y-shaped funnel has funnel sides 24 having been formed by cut portions of the legs 28. The funnel sides 24 (collectively funnel 24) have funnel bents 25, and upper portions 45, which are inwardly bent. The inwardly bent portions 45 are of adequate size to be partially inserted into the slot 34 of a first object 36 (FIG. 1) as described hereinbelow.

Figure 5:
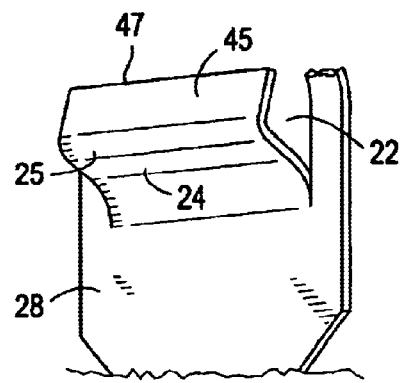
FIG. 5 is a perspective view of the inwardly bent portion of the Y-shaped funnel of the fastener illustrated in FIG. 1, wherein the edge of the inwardly bent portion has a substantially straight configuration.
Figure 6:
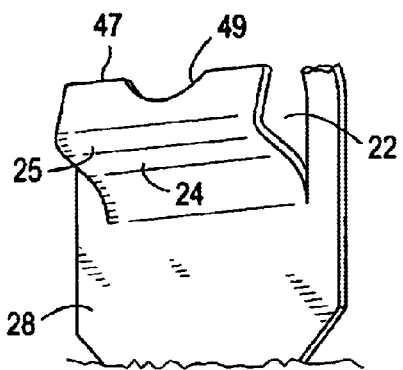
FIG. 6 is a perspective view of the inwardly bent portion of the Y-shaped funnel of the fastener illustrated in FIG. 1, wherein the edge of the inwardly bent portion comprises a curved portion, representing a partial hole.
Figure 7:
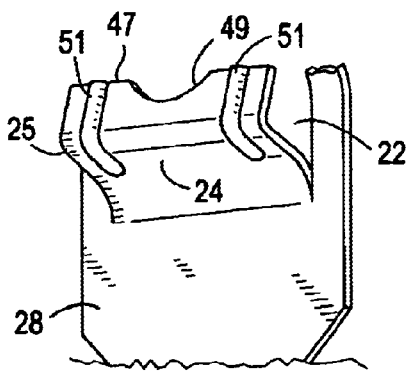
FIG. 7 is a perspective view of the inwardly bent portion of the Y-shaped funnel of the fastener illustrated in FIG. 1, wherein the edge of the inwardly bent portion comprises ribs over the bent for increasing structural integrity.

The inwardly bent or upper portions 45 may have front edges 47 which have substantially straight configuration, as better shown in FIG. 5. The front edges 47 may have curvature(s) 49 as better shown in FIG. 6. The bents 25 may be provided by ribs 51, as better shown in FIG. 7, for increased structural integrity.

It is highly preferable that the distance between the two funnel bents 25 (see FIG. 2) is larger than the width W of the slot 34 of the panel 36. Also, it is important that the distance between each of the funnel bents 25 and the lower side 16 of the head 12 of the fastener 10 is larger than the thickness T of the first object or panel 36 (see FIGS. 1 and 2). Further, it is important that the distance between the edges 47 of the inwardly bent portions 45 and the lower side 16 of the head 12 of the fastener 10 is smaller than the thickness T of the first object or panel 36 (see FIGS. 1 and 2).

Due to the inherent springiness of the opposite bent sides of the Y-shaped funnel 24, the fastener fits snugly to slots with various widths W, thus eliminating a problem of rattling which may be observed with fasteners of the present state of the art, especially when the width W is substantially larger than twice the thickness of the material of construction of the fastener.

The angle A (see FIG. 3) of the bent should preferably be greater than 90°. In any event, it should preferably be such that the fastener can be removed from the first object without destruction of said fastener, when the removal takes place solely from the side of the first object, wherein the head of the fastener is positioned.

Indiscriminately, each of the first and the second objects may be for example a plastic panel or a metal sheet or a handle, or a different type of an object.

In operation, the fastener 10 (FIGS. 1 and 5) is inserted through slot 34 of a first object, such as panel 36 for example (FIGS. 1 and 3). The inwardly bent portions 45 have adequate dimensions so that they are partially inserted into the slot 34 of the first object 36.

In sequence, a second object, such as panel 38 for example, is placed on top having a panel hole 40. The expanding body, preferably screw 26, is then inserted through the panel hole 40, engages to the engageable hole 15 of the fastener 10, and expands the legs 28 by applying force at the contact regions 32.

The expansion of the legs 28 forces the inwardly bent portions 45 against the screw 26, thus providing an efficient additional engagement between the fastener 10 and the screw 26.

The fact that the inwardly bent portions 45 extend into the slot 34 is of utmost importance because any force tending to separate the first object 36 from the second object 38 produces accordingly higher counter-forces by increasingly jamming the inwardly bent portions 45 in the slot 34 and against the screw 26. This is especially important since the screw is now strongly held by the jammed inwardly bent portions 45 and considerably relieves the forces applied to the head bents 18, which bents represent the week point of the fastener, where usually failure occurs. If the inwardly bent portions 45 do not extend into the slot 34, but they remain under the first object or panel 36, as disclosed in our patent application Ser. No. 09/699,758, filed Oct. 30, 2001, the force by which the screw is held by said inwardly bent portions 45 is considerably weaker.

An additional advantage presented by the special configuration of the elements of the instant invention, is that after the fastener 10 has been inserted into the slot 34 of the second object 36, said fastener 10 may be removed by a sliding action of the inwardly bent portions 45 at the edges of the slot 34 (see FIG. 3), without any destruction of the fastener 10. In addition, after the expansion member 26 has been inserted through and engaged on the hole 15, the removal of the fastener becomes exceptionally difficult.

In contrast, in the case of the fasteners disclosed in U.S. Pat. No. 6,409,443 B1 (Lowry et al.), the fastener is destroyed if i slot of the first object, after it has been inserted into said slot, due to outwardly bending of the sides of the Y-shaped funnel.

Figure 9A:
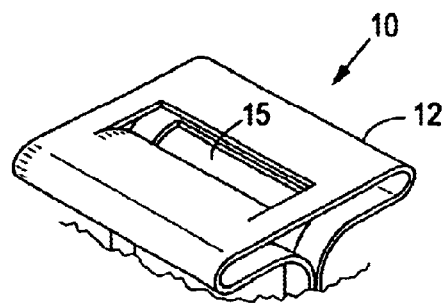
FIG. 9A is a partial perspective view, illustrating an example wherein the engageable hole on the upper side of the fastener has a linear oblong configuration.
Figure 8:
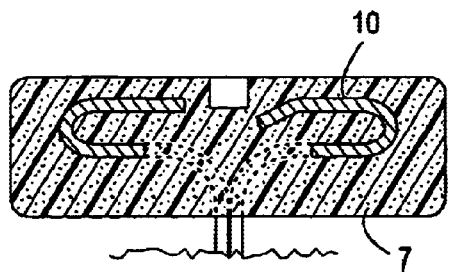
FIG. 8 is a partial cross-section illustrating the fastener of FIG. 1, wherein an elastic body is disposed at least under the lower side of the head.
Figure 9B:
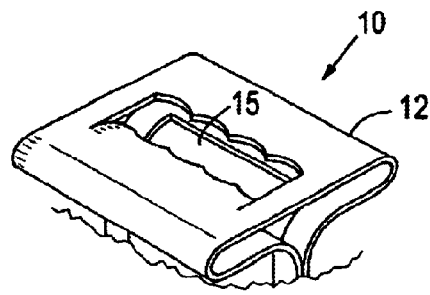
FIG. 9B is a partial perspective view, illustrating an example wherein the engageable hole on the upper side of the fastener has a curved oblong configuration.

As aforementioned, the engageable holes 15 on the upper side 12 of the fastener may have an oblong configuration, as better shown in FIGS. 9A and 9B, wherein their configuration may be linear (exemplified in FIG. 9A), or curved (exemplified in FIG. 9B).

The fasteners of this invention may comprise more than one engagement regions, as disclosed for example in non-provisional application 09/699,760 (Vassiliou), filed Oct. 30, 2000, which is incorporated herein by reference. In the case that the head has an upper side 14 and a lower side 16, it is preferable that the fastener of the instant invention has engagement regions (not shown) under the upper side 14, as disclosed in said application Ser. No. 09/699,760.

Examples of additional engagement regions are better illustrated in FIGS. 10–16.

Figure 10:
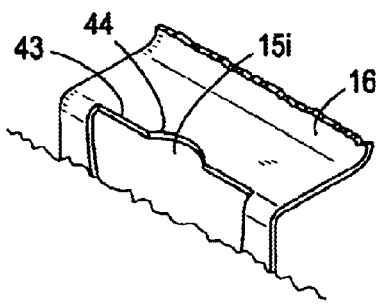
FIG. 10 is a partial perspective view, illustrating an example, wherein the fastener comprises a secondary engageable region on the lower side of the head.
Figure 11:
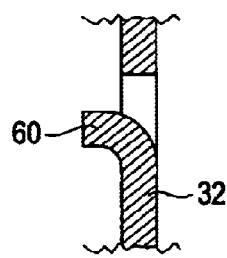
FIG. 11 is a partial cross-section illustrating an example, wherein the fastener comprises a secondary engageable region in the contact region comprising a tab.
Figure 12:
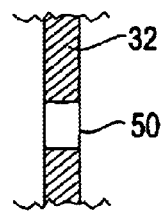
FIG. 12 is a partial cross-section illustrating an example, wherein the fastener comprises a secondary engageable region in the contact region comprising a slit.
Figure 13:
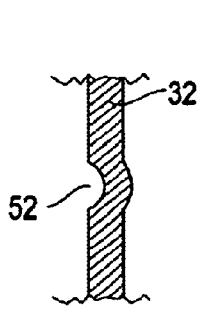
FIG. 13 is a partial cross-section illustrating an example, wherein the fastener comprises a secondary engageable region in the contact region comprising a groove.
Figure 14:
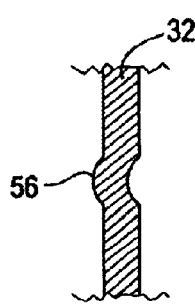
FIG. 14 is a partial cross-section illustrating an example, wherein the fastener comprises a secondary engageable region in the contact region comprising a shoulder.
Figure 15:
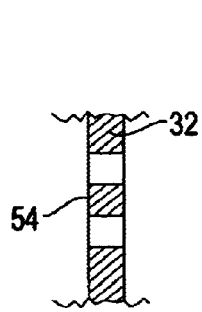
FIG. 15 is a partial cross-section illustrating an example, wherein the fastener comprises a secondary engageable region in the contact region comprising a rib.

An additional engagement may be on the lower side 16 of the head 12, better illustrated in FIG. 10 (which illustrates a portion of only one side of the lower side 16 of the head 12), wherein a partial hole 15i is made by the curved portions 44 of the borders 43 of both sides of the lower side 16.

Figure 16:
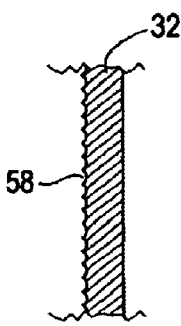
FIG. 16 is a partial cross-section illustrating an example, wherein the fastener comprises a secondary engageable region in the contact region comprising a surface having a roughness greater than that of sandpaper 16.

The contact region 32 (one side only shown in the figures) may be provided with additional engagement, such as tab(s) 60 (FIG. 11), and/or slit(s) 50 (FIG. 12), and/or groove(s) 52 (FIG. 13), and/or shoulder(s) 56 (FIG. 14), and/or rib(s) 54 (FIG. 15), and/or surface 58 having a roughness greater than that of sandpaper #300, and preferably greater than that of sandpaper #100 (FIG. 16). Of course, preferably, the respective contact region on the opposite side has similar elements or combination of elements.

It is evident that the embodiments of the above applications may have to be adjusted to fit the requirements of the instant invention.

The embodiments described hereinabove serve illustration purposes only regarding this invention, which should only be bound by the claims.

Any explanations given are speculative and should not restrict the scope of the claims.

What is claimed is:

1. A combination of a first object having a slot and a spring fastener, the spring fastener comprising:
    (a) a substantially flat head portion having an engageable hole through which an expanding member can pass through and engage;
    (b) a neck having an opening and two side neck portions, the neck extending from the lower side of the substantially flat head portion at a substantially right angle with respect to the substantially flat head portion;
    (c) two substantially flat legs extending from the neck, each leg having an inner surface and a contact region, the two inner surfaces of the two legs being at an initial proximity with each other, the legs being expandable in opposite directions upon inserting the expanding member; and
    (d) a Y-shaped funnel in the vicinity of the contact region, the Y-shaped funnel having a first width, and funnel sides having been formed by partially cut leg portions extending outwardly from the legs, funnel bents, and inwardly bent portions with edges, the inwardly bent portions being of adequate size so as to partially extend into the slot of the first object, when the fastener is positioned in the slot.

2. A combination as defined in claim 1, wherein the head portion of the fastener has a single side corresponding to the lower side.

3. A combination as defined in claim 1, wherein the hole is substantially round having a diameter, and the first width is longer than the diameter of the hole.

4. A combination as defined in claim 1, wherein the hole comprises an oblong opening having a second width, the second width being at least as long as the first width.

5. A combination as defined in claim 1, wherein the expanding member is a screw having threads, a root, and a pitch.

6. A combination as defined in claim 1, wherein the fastener comprises an elastic body molded at least at the lower side of the head of the fastener.

7. A combination as defined in claim 1, wherein the edges of the inwardly bent portions are substantially straight.

8. A combination as defined in claim 1, wherein the edges of the inwardly bent portions comprise curved portions.

9. A combination as defined in claim 1, wherein the funnel bents comprise ribs.

10. A combination as defined in claim 1, wherein the slot of the first object has a width, and the funnel bents are separated by a distance larger than the width of said slot.

11. A combination as defined in claim 1, wherein the first object has a thickness, and each of the funnel bents is separated from the lower side of the head by a distance smaller than the thickness of said first object.

12. A combination as defined in claim 1, wherein the bents have an angle which is adequately large to allow the fastener to be removed from the first object without destruction of said fastener, when the removal takes place solely from the side of the first object, wherein the head of the fastener is positioned.

13. A combination as defined in claim 1, wherein the spring fastener comprises more than one engagement regions.

14. A combination as defined in claim 1, wherein the head portion of the fastener comprises an upper side and a lower side.

15. A combination as defined in claim 14, wherein the spring fastener comprises engagement regions under the upper side of the head.

16. A spring fastener comprising:
(a) a substantially flat head portion having an engageable hole through which an expanding member can pass through and engage;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface and a contact region, the two inner surfaces of the two legs being at an initial proximity with each other, the legs being expandable in opposite directions upon inserting the expanding member; and
(d) a Y-shaped funnel in the vicinity of the contact region, the Y-shaped funnel having a first width, and funnel sides having been formed by partially cut leg portions extending outwardly from the legs, funnel bents, and inwardly bent portions with edges, the inwardly bent portions being of adequate size so as to partially extend into a slot of a first object, when the fastener is positioned in the slot.

17. A spring fastener as defined in claim 16, wherein the head portion of the fastener comprises an upper side and a lower side.

18. A spring fastener as defined in claim 16, wherein the head portion of the fastener has a single side corresponding to the lower side.

19. A spring fastener as defined in claim 16, wherein the hole is substantially round having a diameter, and the first width is longer than the diameter of the hole.

20. A spring fastener as defined in claim 16, wherein the hole comprises an oblong opening having a second width, the second width being at least as long as the first width.

21. A spring fastener as defined in claim 16, wherein the expanding member is a screw having threads, a root, and a pitch.

22. A spring fastener as defined in claim 16, wherein the fastener comprises an elastic body molded at least at the lower side of the head of the fastener.

23. A spring fastener as defined in claim 16, wherein the edges of the inwardly bent portions are substantially straight.

24. A spring fastener as defined in claim 16, wherein the edges of the inwardly bent portions comprise curved portions.

25. A spring fastener as defined in claim 16, wherein the funnel bents comprise ribs.

26. A spring fastener as defined in claim 16, wherein the slot of the first object has a width, and the funnel bents are separated by a distance larger than the width of said slot.

27. A spring fastener as defined in claim 16, wherein the first object has a thickness, and each of the funnel bents is separated from the lower side of the head by a distance smaller than the thickness of said first object.

28. A spring fastener as defined in claim 16, wherein the bents have an angle which is adequately large to allow the fastener to be removed from the first object without destruction of said fastener, when the removal takes place solely from the side of the first object, wherein the head of the fastener is positioned.

29. A spring fastener as defined in claim 16, comprising more than one engagement regions.

30. A spring fastener as defined in claim 17, comprising engagement regions under the upper side of the head.

31. A vehicle comprising a first object having a slot and a second object having a hole, connected with a spring fastener, the spring fastener comprising:
(a) a substantially flat head portion having an engageable hole through which an expanding member can pass through and engage;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface and a contact region, the two inner surfaces of the two legs being at an initial proximity with each other, the legs being expandable in opposite directions upon inserting the expanding member; and
(d) a Y-shaped funnel in the vicinity of the contact region, the Y-shaped funnel having a first width, and funnel sides having been formed by partially cut leg portions extending outwardly from the legs, funnel bents, and inwardly bent portions with edges, the inwardly bent portions being of adequate size so as to partially extend into the slot of the first object, when the fastener is positioned in said slot.

32. A vehicle as defined in claim 31, wherein the head portion of the fastener comprises an upper side and a lower side.

33. A vehicle as defined in claim 31, wherein the head portion of the fastener has a single side corresponding to the lower side.

34. A vehicle as defined in claim 31, wherein the engageable hole is substantially round having a diameter, and the first width is longer than the diameter of the hole.

35. A vehicle as defined in claim 31, wherein the engageable hole comprises an oblong opening having a second width, the second width being at least as long as the first width.

36. A vehicle as defined in claim 31, wherein the expanding member is a screw having threads, a root, and a pitch.

37. A vehicle as defined in claim 31, wherein the fastener comprises an elastic body molded at least at the lower side of the head of the fastener.

38. A vehicle as defined in claim 31, wherein the edges of the inwardly bent portions are substantially straight.

39. A vehicle as defined in claim 31, wherein the edges of the inwardly bent portions comprise curved portions.

40. A vehicle as defined in claim 31, wherein the funnel bents comprise ribs.

41. A vehicle as defined in claim 31, wherein the slot of the first object has a width, and the funnel bents are separated by a distance larger than the width of said slot.

42. A vehicle as defined in claim 31, wherein the first object has a thickness, and each of the funnel bents is separated from the lower side of the head by a distance smaller than the thickness of said first object.

43. A vehicle as defined in claim 31, wherein the bents have an angle which is adequately large to allow the fastener to be removed from the first object without destruction of said fastener, when, in the absence of the second object, the removal takes place solely from the side of the first object, wherein the head of the fastener is positioned.

* * * * *